United States Patent
Kalinhoff et al.

(10) Patent No.: US 11,162,608 B2
(45) Date of Patent: Nov. 2, 2021

(54) AIR VENT AND LIQUID RELIEF VALVE FOR A PRESSURIZED SYSTEM

(71) Applicant: A.R.I. Fluid Control Accessories Ltd., Kfar Charuv (IL)

(72) Inventors: Eitan Kalinhoff, Kfar Vradim (IL); Samy Skitnevsky, Kfar Charuv (IL)

(73) Assignee: A.R.I. Fluid Control Accessories Ltd., Kfar Chans (IL)

( * ) Notice: Subject to any disclaimer, the term of this patent is extended or adjusted under 35 U.S.C. 154(b) by 0 days.

(21) Appl. No.: 16/826,237

(22) Filed: Mar. 22, 2020

(65) Prior Publication Data
US 2021/0293352 A1    Sep. 23, 2021

(51) Int. Cl.
*F16K 31/385* (2006.01)
*F16K 31/36* (2006.01)
*F16K 31/38* (2006.01)
*F16K 24/04* (2006.01)

(52) U.S. Cl.
CPC ............ *F16K 31/385* (2013.01); *F16K 31/36* (2013.01); *F16K 31/38* (2013.01); *F16K 24/042* (2013.01)

(58) Field of Classification Search
CPC ........ F16K 31/385; F16K 31/38; F16K 31/36; F16K 24/042
USPC ....................................................... 251/25, 34
See application file for complete search history.

(56) References Cited

U.S. PATENT DOCUMENTS

| | | | | |
|---|---|---|---|---|
| 1,724,878 A | * | 8/1929 | Jensen | F16K 17/36 137/43 |
| 3,712,578 A | * | 1/1973 | Dawson | F16K 7/17 251/35 |
| 4,052,965 A | * | 10/1977 | Morris | F01P 7/16 123/41.05 |
| 4,640,304 A | * | 2/1987 | Looney | F16K 24/046 137/202 |
| 5,019,141 A | * | 5/1991 | Granville | B01D 19/0063 137/202 |
| 2009/0000667 A1 | * | 1/2009 | Bottura | F16K 15/042 137/202 |

* cited by examiner

*Primary Examiner* — Umashankar Venkatesan
(74) *Attorney, Agent, or Firm* — Dekel Patent Ltd.; David Klein

(57) ABSTRACT

A valve with a controlled closing system includes housing having an inlet port, a liquid outlet port, and an inlet chamber. A pressure responsive closing mechanism is disposed between the inlet port and the liquid outlet port. A control chamber is in fluid communication with the inlet chamber via a fluid passage. The fluid passage includes a controlled closing system for controlling opening and closing of the fluid passage. The controlled closing system includes a seal movable with respect to and sealable against an opening of the fluid passage.

5 Claims, 7 Drawing Sheets

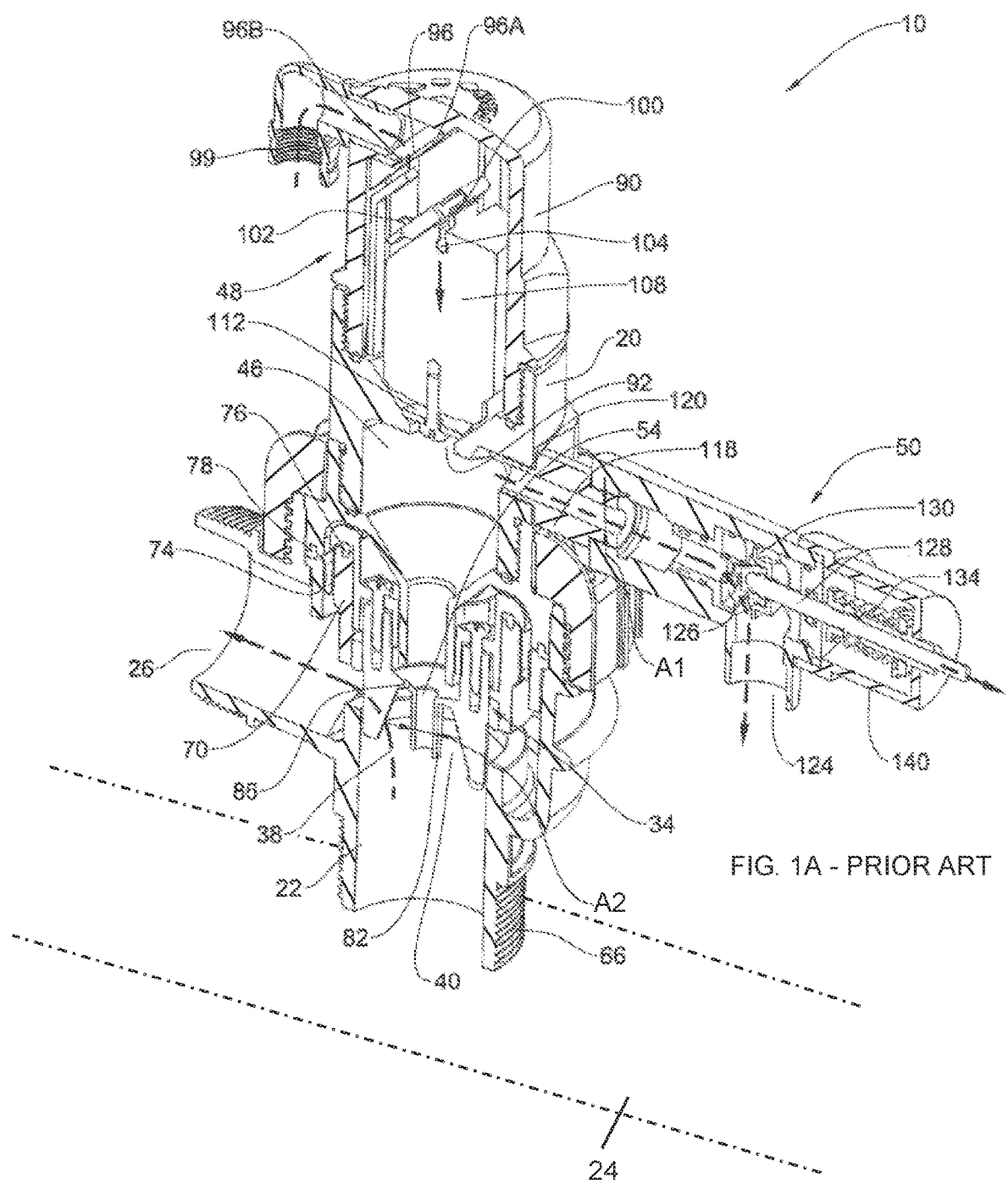
FIG. 1A - PRIOR ART

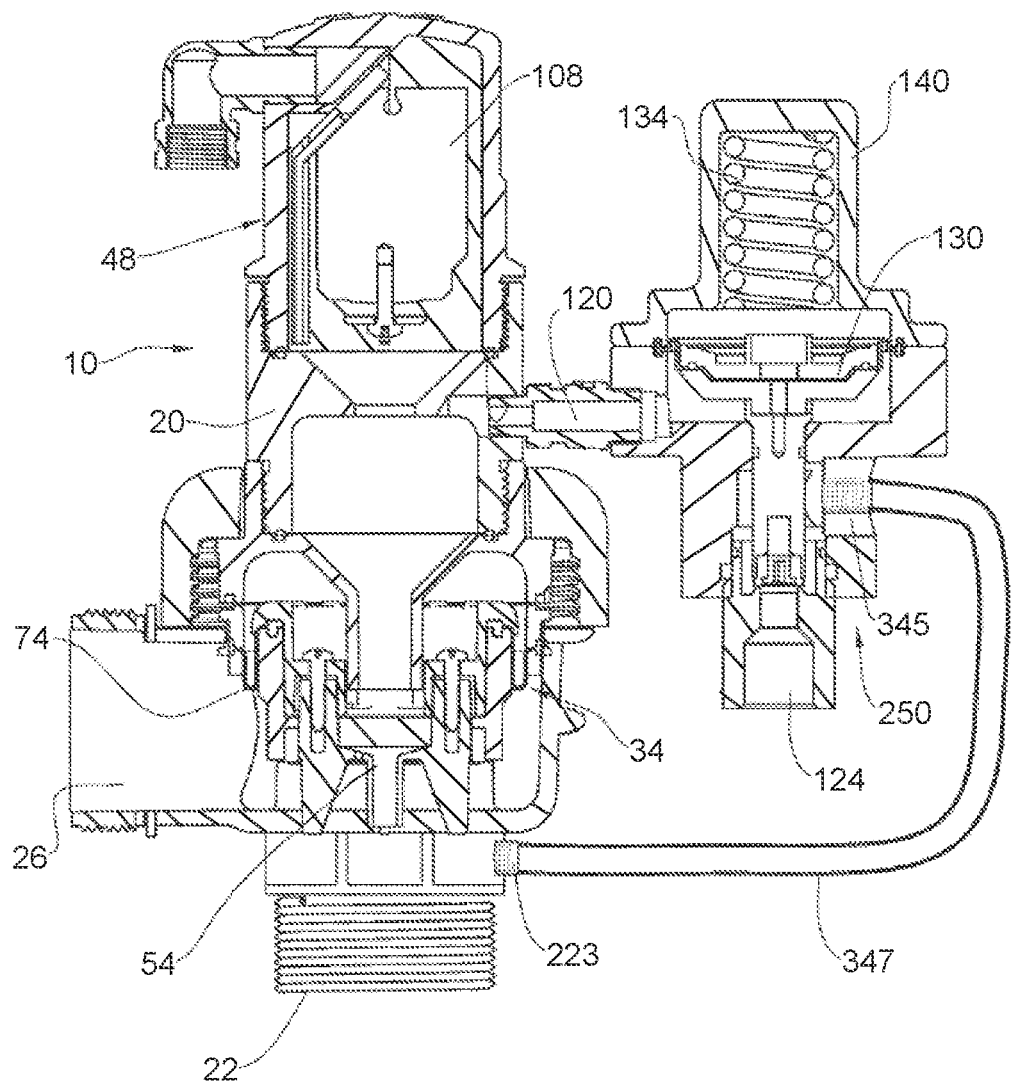
FIG. 1B - PRIOR ART

AIR VENT AND LIQUID RELIEF VALVE FOR A PRESSURIZED SYSTEM

FIELD OF THE INVENTION

The present invention relates generally to hydraulic valves, and particularly to a controlled closing system for a hydraulic valve, such as a liquid discharge valve.

BACKGROUND OF THE INVENTION

European Patent 3039326, assigned to the assignee of the invention disclosed hereinbelow, describes a liquid discharge valve, configured for high flow and discharging of liquid at high pressure. The valve is described with reference to FIGS. 1A and 1B.

In FIG. 1A, a liquid discharge valve 10 includes a housing 20 with an inlet port 22, which can be coupled to a liquid line 24 (shown in broken lines), and a liquid outlet port 26. The liquid outlet port 26 extends from the housing and can be coupled for returning any liquids flushed therethrough to the liquid system, or for disposing elsewhere.

An inlet chamber 40 includes a pressure responsive closing mechanism 34 disposed between inlet port 22 and liquid outlet port 26. The closing mechanism 34 is configured for selectively opening a liquid flow path 38 between inlet port 22 and liquid outlet port 26. A control chamber 46 is in flow communication with the inlet chamber 40 via a restricted fluid passage 54. In the prior art, fluid passage 54 is always open.

A gas operated valve 48 is in fluid communication with the control chamber 46. A discharge pilot valve 50 is in fluid communication with the control chamber 46.

The closing mechanism 34 is configured to be normally disposed at its closed position so as to prevent liquid flow from the inlet port 22 to the liquid outlet port 26. The gas operated valve 48 at its closed position is configured for preventing liquid flow through a fluid outlet port 99. In the event of pressure decrease within the control chamber 46, the closing mechanism 34 displaces into its open position, thereby permitting liquid flow along the flow path 38 between the inlet port 22 and the liquid outlet port 26.

The pressure responsive closing mechanism 34 includes a plunger assembly 70 which is axially displaceable between an uppermost, open position and a lowermost, closed position. The always-open fluid passage 54 extends through the plunger assembly 70 of the closing mechanism 34. A rolling membrane 74 is clamped at one end thereof 76 to the plunger assembly 70 and at another end thereof 78 it is clamped to a portion fixed within inside walls of the housing. The membrane 74 is a flexible sealing member and divides the housing into the inlet chamber 40 and the control chamber 46.

A liquid drainage port 86 may extend between the control chamber 46 and the inlet chamber 40 to allow liquid to drain from control chamber 46 back to liquid line 24.

The gas operated valve 48 includes a housing 90 fixedly coupled to the housing 20, and a fluid inlet 92 that extends into and which is in flow communication with the control chamber 46.

The housing 90 has a fluid through-flow aperture 96 communicating with an outlet 99 and a valve seat formed in housing 90 that bounds aperture 96. A flexible closure membrane 100 is secured at one end 102 to housing 90 and at a second end 104 to a float member 108 disposed within the housing 90. The float member 108 is axially displaceable between a lowermost, open position and an uppermost, closed position under buoyant pressure. At the closed position, the closure membrane 100 presses against the valve seating so as to seal aperture 96.

The through-flow aperture 96 may have a first outlet aperture 96A of substantially elongated slit-like shape, and may communicate at one end thereof with a second outlet aperture 96B, which is substantially greater in area than the first aperture 96A.

The displacement of the float member 108 from the closed position to the open position progressively detaches successive linear transverse portions of the closure membrane 100, initially from the first outlet aperture 96A and subsequently from the second outlet aperture 96B, whereas displacement of float member 108 from the open position to the closed position, allows for the closure membrane 100 to become sealingly biased against the outlet apertures and seal the valve seating. At a bottom end of the float member 108 there is a one way valve 112 in the form of a sealing disc configured for bearing against sealing shoulders of the fluid inlet 92 for sealing thereof; this prevents fluid ingress into the control chamber 46 when the gas operated valve 48 is at its open position.

The discharge pilot valve 50 is coupled to the housing 20 with an inlet port 118. An inlet fluid flow path 120 extends into the control chamber 46. The cross-sectional area of the inlet fluid flow path 120 (A1) is greater than that of the restricted fluid passage 54 (A2).

The discharge pilot valve 50 is configured with a discharge port 124 and a sealing shoulder 126 disposed between the inlet port 118 and the discharge port 124. A sealing plunger 128 is configured at one end thereof with a sealing member 130 configured for bearing against the annular sealing shoulder 126 in a sealing fashion, with an opposite end of the plunger 128 being biased by a compression spring 134. The plunger is thus displaceable between a normally closed position, wherein the sealing member 130 sealingly bears against the sealing shoulder 126, and an open position wherein the sealing member 130 is disengaged from the sealing shoulder 126, so as to relieve pressure from the control chamber 46.

Accordingly, the discharge pilot valve 50 is a pressure relief valve configured for opening at a predetermined pressure threshold. This pressure threshold is controllable through manual governing the compression force of the coiled spring 134 by rotating the cap 140 (or a bolt in FIGS. 2-6), thereby tensioning or releasing the spring.

FIG. 1B illustrates another version of the liquid discharge valve 10. In this version, a discharge pilot valve 250 has a tube 347 that is coupled to inlet 22 at a coupling port 223 and to a control chamber of the discharge pilot valve 250 at an additional port 345.

In this arrangement, the inlet 22 and the control chamber of the discharge pilot valve 250 are at the same pressure. This eliminates or substantially reduces hammering, thereby providing stable operation of the discharge pilot valve 250.

SUMMARY OF THE INVENTION

The present invention seeks to provide an improved a controlled closing system for a hydraulic valve, such as a liquid discharge valve, as described more in detail hereinbelow. The controlled closing system will be described for a valve of the type shown in FIG. 1A or 1B, but the invention is not limited to this type of valve.

There is thus provided in accordance with an embodiment of the present invention a valve with a controlled closing system including a housing having an inlet port, a liquid outlet port, an inlet chamber, a pressure responsive closing mechanism disposed between the inlet port and the liquid outlet port and configured for selectively opening a liquid flow path therebetween, a control chamber in fluid communication with the inlet chamber via a fluid passage, a gas operated valve in fluid communication with the control chamber and with an outlet aperture, wherein the closing mechanism is configured to be displaced into an open position to permit liquid flow along the flow path between the inlet port and the liquid outlet port, and wherein the fluid passage includes a controlled closing system for controlling opening and closing of the fluid passage, the controlled closing system including a seal movable with respect to and sealable against an opening of the fluid passage.

BRIEF DESCRIPTION OF THE DRAWINGS

The present invention will be understood and appreciated more fully from the following detailed description taken in conjunction with the drawings in which:

FIGS. 1A and 1B are simplified cutaway illustrations of a prior art liquid discharge valve, as described in European Patent 3039326;

FIGS. 2-6 are simplified cutaway illustrations of a controlled closing system for a hydraulic valve liquid discharge valve, constructed and operative in accordance with a non-limiting embodiment of the present invention, wherein:

In FIG. 2, a movable seal of the closing system does not seal against a fluid passage between an inlet chamber and a control chamber of the valve, a plunger assembly of a pressure responsive closing mechanism seals against an inlet of the valve, and a float member of a gas operated valve does not press a closure membrane to seal against an outlet aperture of the gas operated valve, so that air entering the inlet of the valve can rise and flow through the fluid passage between the inlet chamber and the control chamber, flow past the float member and flow out the outlet aperture of the gas operated valve to the outside environment;

In FIG. 3, the pressure in the inlet chamber is greater than the atmospheric pressure which is the pressure in the control chamber; this pressure difference causes the plunger assembly of the pressure responsive closing mechanism to rise and allow liquid (water) and gas (air) to enter the inlet, which causes the movable seal of the closing system to rise and seal against the fluid passage between the inlet chamber and the control chamber of the valve, and also causes the float member of the gas operated valve to press the closure membrane to seal against the outlet aperture of the gas operated valve, so that air entering the inlet of the valve does not flow out the outlet aperture of the gas operated valve and fluid entering the inlet can flow out of the liquid outlet port;

In FIG. 4, fluid has entered the control chamber above the rolling membrane, so that the pressure in the control chamber is the same as the pressure in the inlet chamber; due to differences in area the pressure responsive closing mechanism starts to descend. The movable seal of the closing system still seals against the fluid passage between the inlet chamber and the control chamber of the valve. This slows the descending movement of the plunger assembly of the pressure responsive closing mechanism;

In FIG. 5, the plunger assembly of the pressure responsive closing mechanism has finished its descent and seals the inlet of the valve; as soon as fluid cannot flow anymore to the liquid outlet port, the seal immediately drops to open the fluid passage and the valve is ready for air to enter the valve inlet and return to the configuration of FIG. 2; and In FIG. 6, after having returned to the configuration of FIG. 2, gas (air) entering the valve inlet creates negative pressure in the control chamber, which causes the plunger assembly of the pressure responsive closing mechanism to rise; this causes air to enter the outlet aperture of the gas operated valve into the rest of the valve and purge out liquid from the valve to the liquid line or liquid outlet port.

DETAILED DESCRIPTION OF EMBODIMENTS

Figure 2:
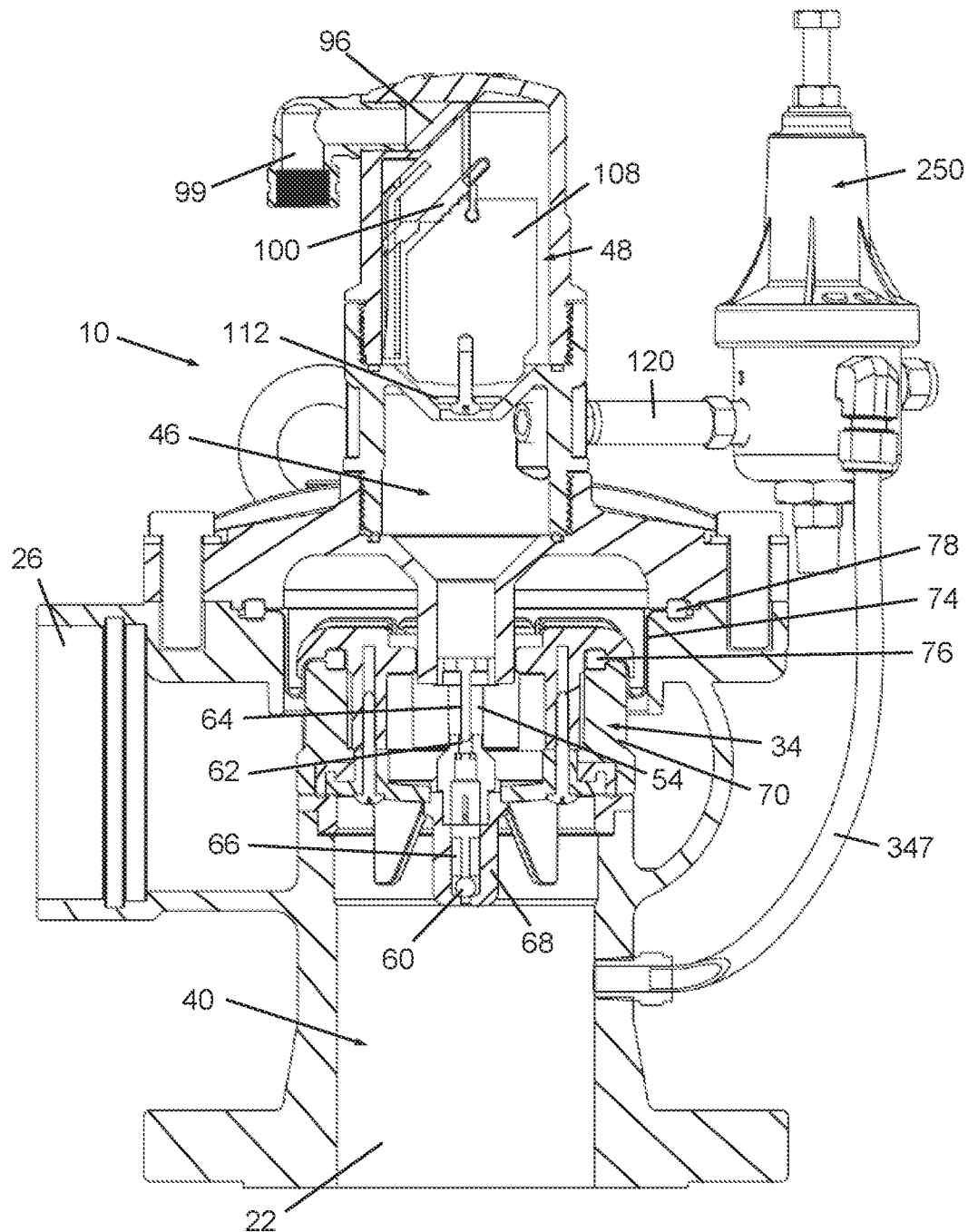

Reference is now made to FIG. 2, which illustrates a controlled closing system for a hydraulic valve liquid discharge valve, constructed and operative in accordance with a non-limiting embodiment of the present invention. For ease of understanding, the description follows for the valve 10 of FIGS. 1A-1B; like elements are designated by like reference numerals. However, the invention is not limited to this valve and can be carried out with other hydraulic valves.

In the prior art, the restricted fluid passage 54 is always open. In contrast to the prior art, in the present invention, the restricted fluid passage 54 is not always open. Instead, a controlled closing system is provided that controls opening and closing of fluid passage 54, as is described below.

In one embodiment of the invention, the controlled closing system includes a seal 60 movable with respect to and sealable against an opening 62 of fluid passage 54, the opening 62 facing inlet 22. The opening 62 may be the lower opening of the fluid passage 54, or alternatively as in the illustrated embodiment, the opening 62 is at the lower end of a tube 64 mounted in the existing fluid passage 54, so that tube 64 becomes the fluid passage of the system of the invention.

Seal 60 may be spherical as shown, or alternatively may be oblong, ellipsoid or other shapes. Seal 60 is free to move axially (up and down) in a bore 66 of a seal housing 68. Seal 60 is preferably denser than the liquid entering the inlet 22.

The operation of the system is now described with reference to FIGS. 2-6.

In FIG. 2, the movable seal 60 does not seal against the fluid passage (that is, either the tube 64 or the fluid passage 54), which is between inlet chamber 40 and control chamber 46. The plunger assembly 70 of the pressure responsive closing mechanism 34 seals against the inlet 22 of valve 10. The float member 108 of gas operated valve 48 does not press closure membrane 100 to seal against outlet aperture 96 of gas operated valve 48, so that air entering the inlet 22 of the valve 10 can rise and flow past (around) seal 60 through the fluid passage 64 (or 54) between the inlet chamber 40 and the control chamber 46, flow past the float member 108 and flow out the outlet aperture 96 of the gas operated valve 48 to the outside environment.

Figure 3:
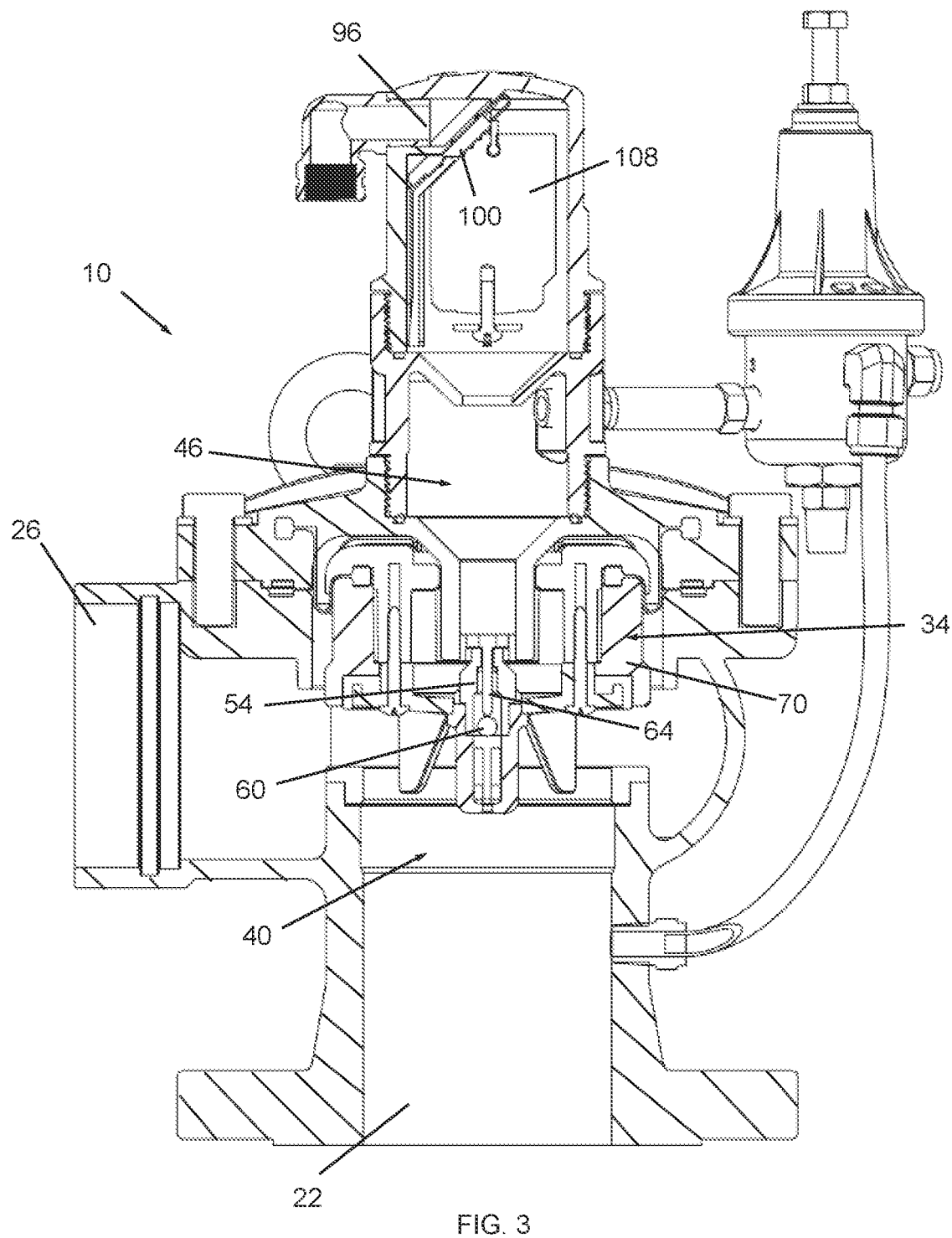

In FIG. 3, the pressure in the inlet chamber 40 is greater than the atmospheric pressure which is the pressure in the control chamber 46. This pressure difference causes the plunger assembly 70 of the pressure responsive closing mechanism 34 to rise and allow liquid (water) and gas (air) to enter the inlet 22, which causes the movable seal 60 of the closing system to rise and seal against the fluid passage 64 (or 54) between the inlet chamber 40 and the control chamber 46 of the valve 10. This also causes the float member 108 of the gas operated valve 48 to press the closure membrane 100 to seal against the outlet aperture 96 of the gas operated valve 48, so that air entering the inlet 22 of the valve 10 does not flow out the outlet aperture 96 of the gas operated valve 48 and fluid entering the inlet 22 can flow out of the liquid outlet port 26.

Figure 4:
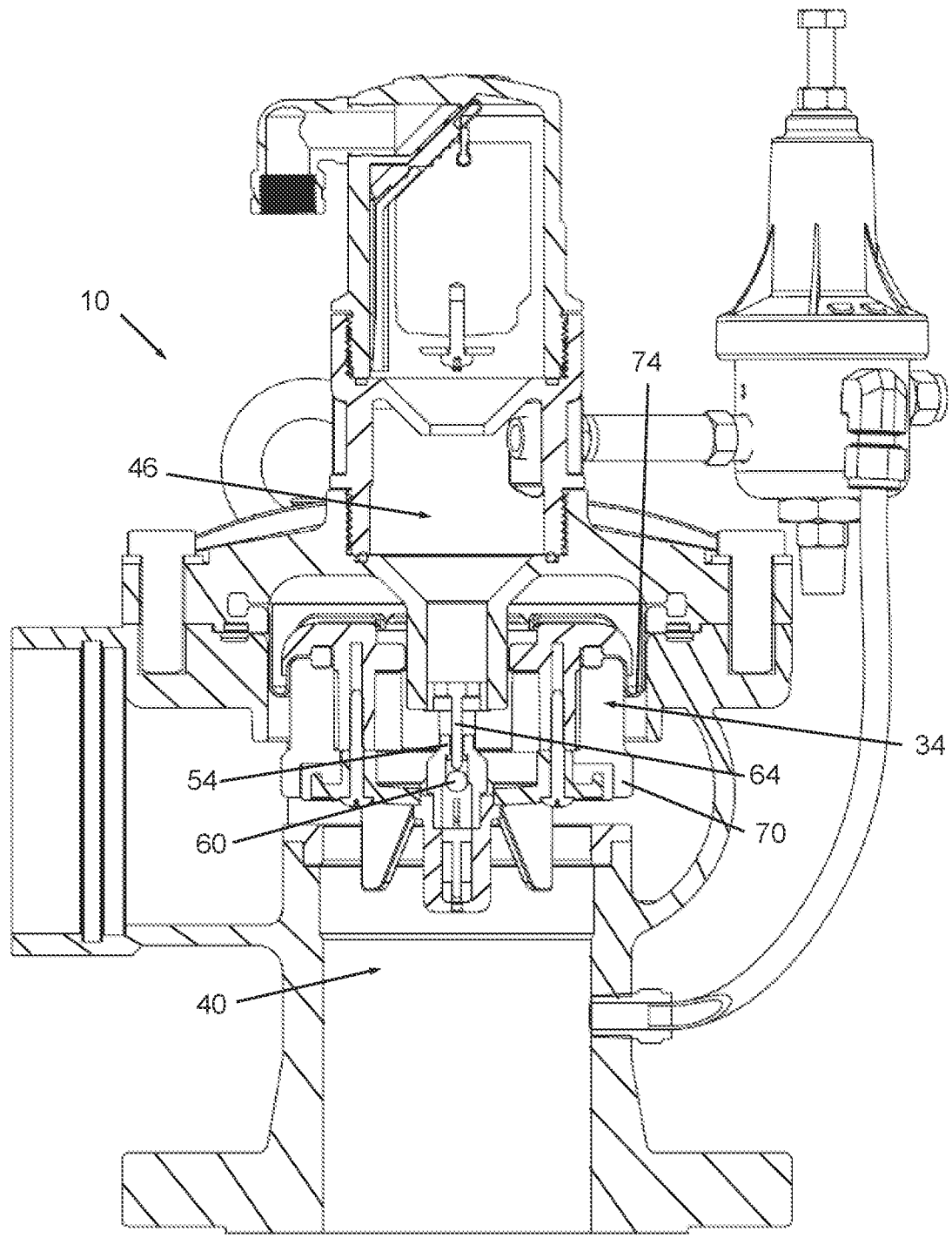

In FIG. 4, fluid has entered the control chamber 46 above the rolling membrane 74, so that the pressure in the control chamber 46 is the same pressure in the inlet chamber 40. However, the area above the membrane 74 is greater than the area below the membrane 74. This difference in area causes the plunger assembly 70 of the pressure responsive closing mechanism 34 to descend. The movable seal 60 of the closing system still seals against the fluid passage 64 (or 54) between the inlet chamber 40 and the control chamber 46 of the valve 10. In contrast with the prior art, this slows the descending movement of the plunger assembly 70 of the pressure responsive closing mechanism 34.

Figure 5:
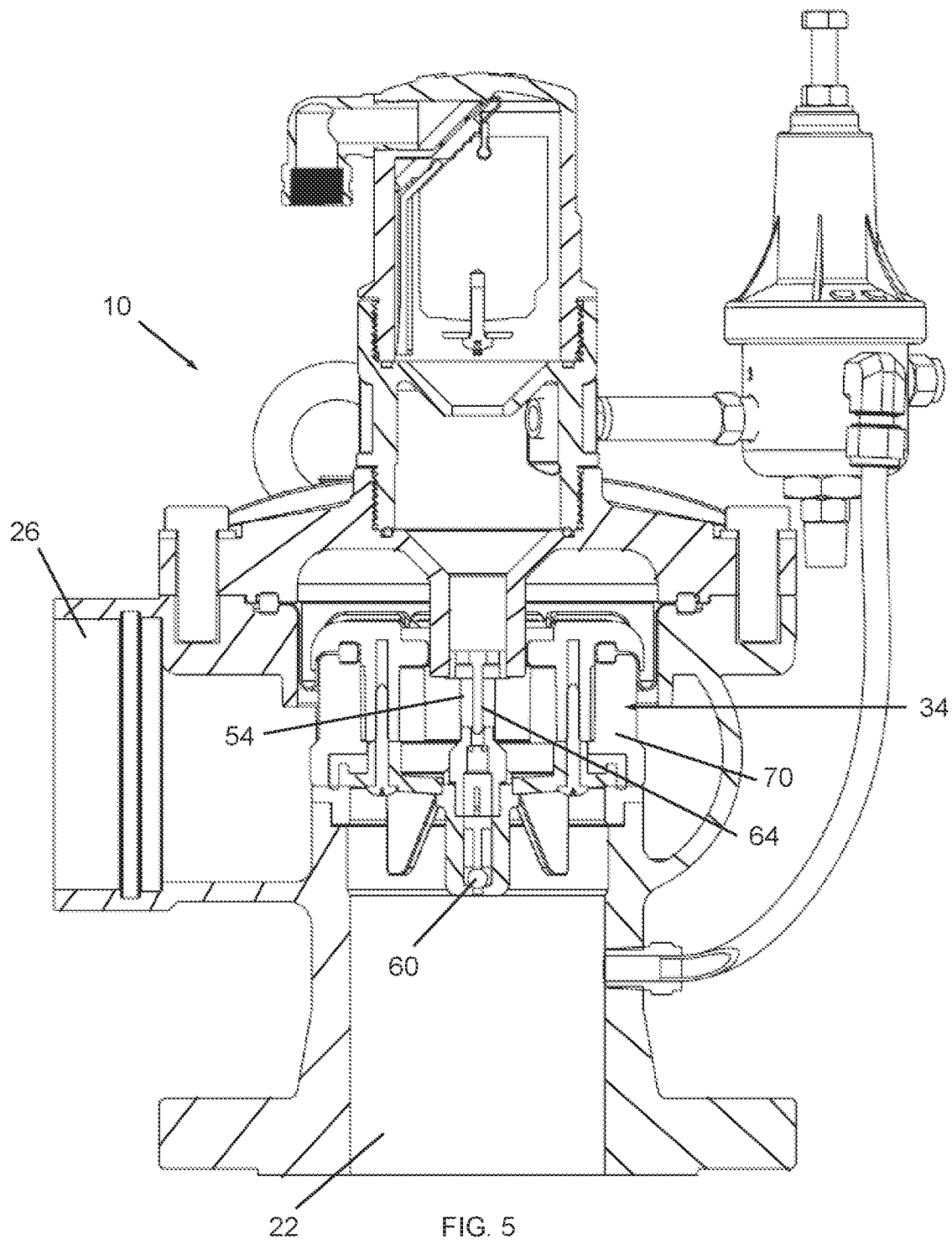

In FIG. 5, the plunger assembly 70 of the pressure responsive closing mechanism 34 has finished its descent and seals the inlet 22 of the valve 10. As soon as fluid cannot flow anymore to the liquid outlet port 26, the seal 60 immediately drops to open the fluid passage 64 (or 54) and the valve 10 is ready for air to enter the valve inlet 22 and return to the configuration of FIG. 2.

Thus, the movable seal 60 of the closing system provides a slower and more controlled closure of the fluid passage between the inlet chamber 40 and the control chamber 46 and yet provides an immediate response to closure of the valve inlet 22 to return to the initial operative configuration.

Figure 6:
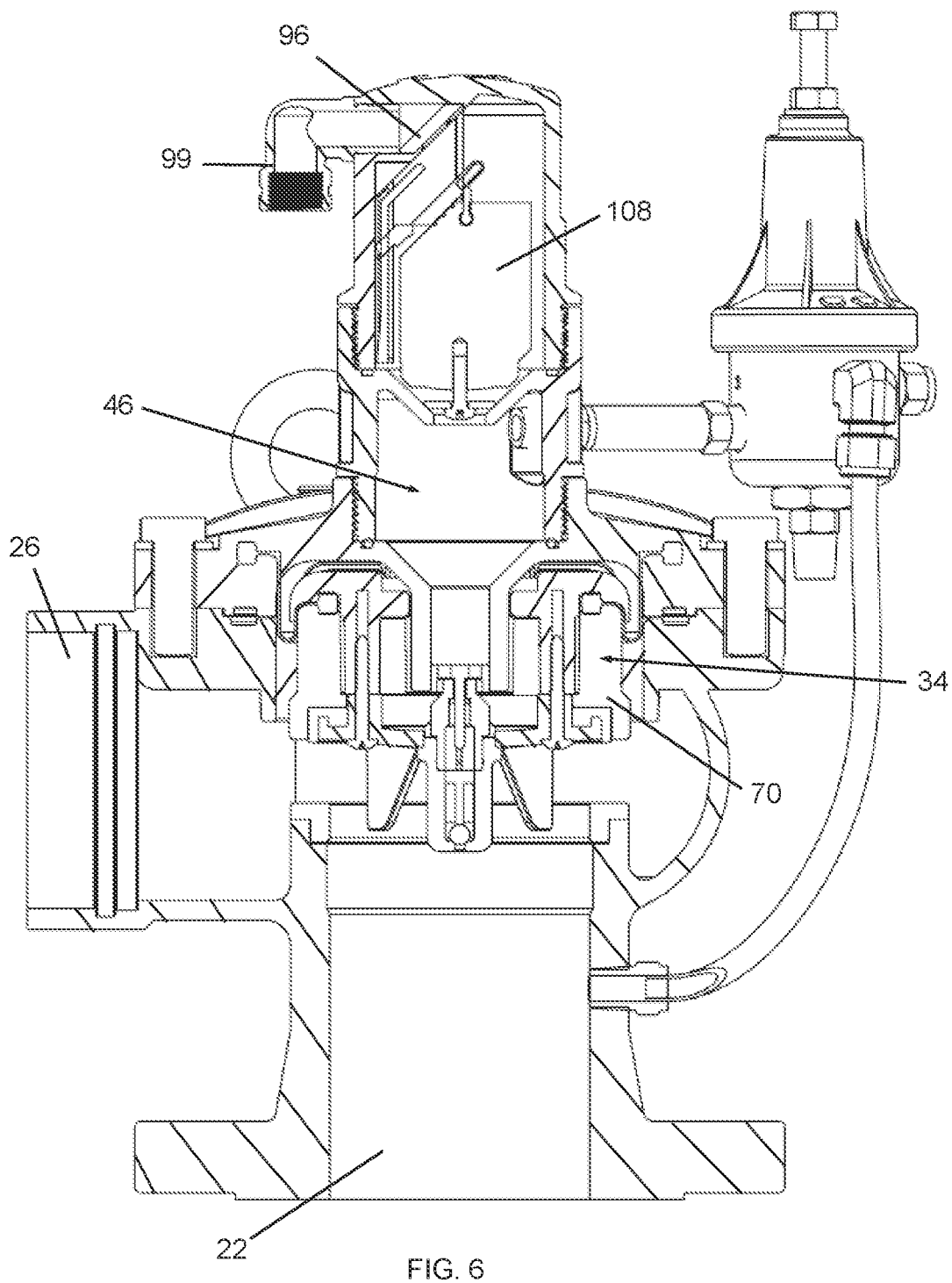

In FIG. 6, after having returned to the configuration of FIG. 2, gas (air) entering the valve inlet 22 creates negative pressure in the control chamber 46, which causes the plunger assembly 70 of the pressure responsive closing mechanism 34 to rise. This causes air to enter the outlet aperture 96 of the gas operated valve towards control chamber 46 into the rest of the valve and purge out liquid from the valve to the liquid line or liquid outlet port 26.

What is claimed is:

1. A method of using a valve comprising:

a housing having an inlet port, a liquid outlet port, an inlet chamber, a pressure responsive closing mechanism disposed between said inlet port and said liquid outlet port and configured for selectively opening a liquid flow path therebetween, a control chamber in fluid communication with said inlet chamber via a fluid passage, a gas operated valve in fluid communication with said control chamber and with an outlet aperture, wherein said closing mechanism is configured to be displaced into an open position to permit liquid flow along said flow path between said inlet port and said liquid outlet port; wherein said fluid passage comprises a controlled closing system for controlling opening and closing of said fluid passage, said controlled closing system comprising a seal movable with respect to and sealable against an opening of said fluid passage, wherein said seal does not seal against said fluid passage, said pressure responsive closing mechanism seals against said inlet port, and said gas operated valve does not seal against said outlet aperture, so that gas entering said inlet port of the valve can rise and flow past said seal through said fluid passage, and flow out said outlet aperture;

wherein when pressure in said inlet chamber is greater than pressure in said control chamber, which causes said pressure responsive closing mechanism to rise and allow fluid to enter said inlet port, which causes said seal to rise and seal against said fluid passage, and causes said gas operated valve to seal against said outlet aperture, so that gas entering said inlet port does not flow out said outlet aperture and fluid entering said inlet port can flow out of said liquid outlet port;

wherein when pressure in said control chamber is greater than pressure in said inlet chamber which causes said pressure responsive closing mechanism to descend towards said inlet port, and wherein said seal seals against said fluid passage, thereby slowing descent of said pressure responsive closing mechanism; and wherein when said pressure responsive closing mechanism seals said inlet port, and as soon as fluid cannot flow anymore to said liquid outlet port, said seal immediately drops to open said fluid passage.

2. The method according to claim 1, wherein said opening of said fluid passage faces said inlet port.

3. The method according to claim 1, wherein said opening is at an end of a tube.

4. The method according to claim 1, wherein said seal is free to move axially in a bore of a seal housing.

5. The method according to claim 1, wherein said seal is spherical and is denser than liquid entering said inlet port.

* * * * *